United States Patent Office 3,003,977
Patented Oct. 10, 1961

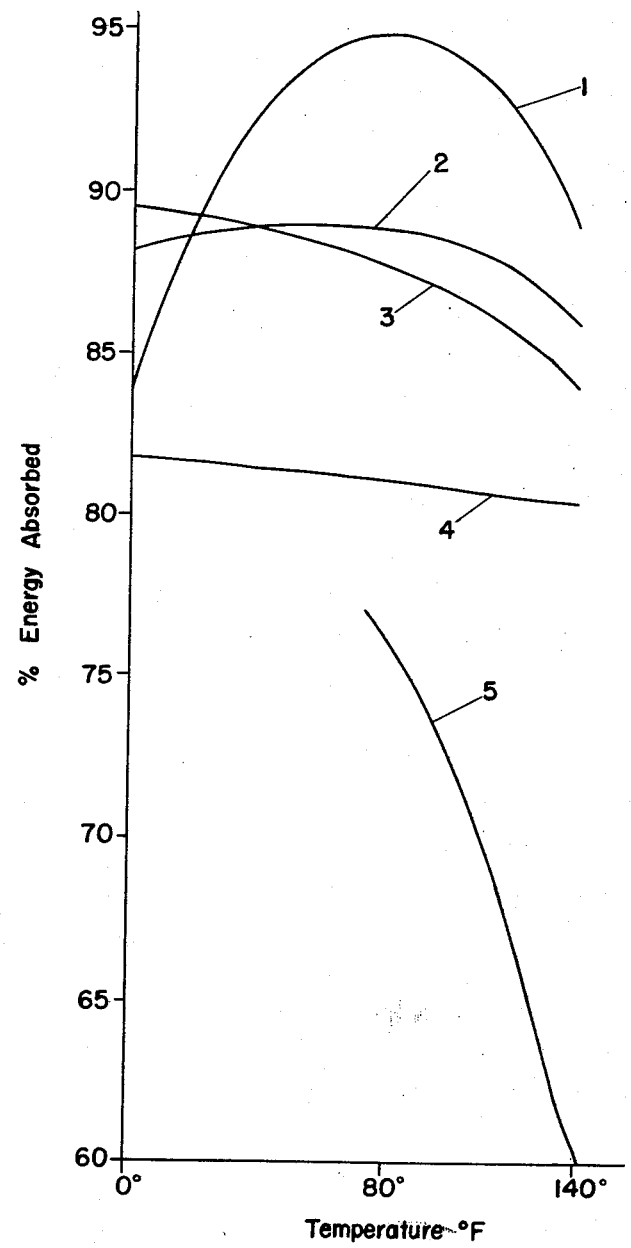

3,003,977
CELLULAR POLYURETHANES PREPARED FROM AMINO GLYCOL BASED POLYESTERS
Marvin J. Hurwitz, Elkins Park, and Richard Zdanowski, Philadelphia, Pa., assignors to Rohm & Haas Company, Philadelphia, Pa., a corporation of Delaware
Filed Nov. 5, 1958, Ser. No. 772,025
9 Claims. (Cl. 260—2.5)

This invention concerns cellular plastic materials. More particularly, it relates to cellular materials which result from the reaction of water with polyurethane products formed from isocyanates and specific polyesters having a functionality in the range of 2.2 to 3.0 and having at least 70 mole percent of the glycol component of the polyester made up with a specific aromatic glycol further defined hereinafter. Our new polyurethane products are further characterized by remarkable shock absorbing qualities.

Isocyanate modified polyesters are known in the art. Generally, the polyesters are formed by condensing polybasic carboxylic acids with polyhydric alcohols. The condensation reaction proceeds with elimination of water to produce a large molecule which is predominantly linear, though it may be branched to the extent to which the polyester is formed from carboxylic acids or alcohols having more than two functional groups resulting in a polyester having terminal hydroxyl groups. After condensation, the polyester molecule may be further reacted with these terminal hydroxyl groups and a predetermined proportion of an organic isocyanate with the formation of urethane linkages

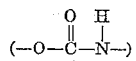

The polymer which is formed may be referred to as a prepolymer. These polymers are storable over long periods of time without hardening or curing. The curing or cross-linking of these polymers takes place at various places along its chain as a result of reaction between the —NCO groups in the organic isocyanate curing agent and the reactive hydrogens in the terminal hydroxyl groups. When the prepolymers are brought together with an isocyanate curing agent in the presence of water, rapid reaction takes place with the generation of exothermic heat while polyester units are bridged together by the polyurethane linkages and carbon dioxide is generated. This gas, under appropriate conditions, is entrapped in the mass to form polyurethane resins or foams of high cellularity. A method whereby we presently prefer to prepare our cellular foams is by concurrently reacting the polyester, the polyisocyanate, and the water in the presence of additives, if desired.

The type of polyurethane foams known in the art may be roughly classed into two groups. first, those materials characterized by elastomeric rubber-like properties. These materials, such as the polyurethanes reacted-polyesters foam adipates, are materials which exhibit satisfactory flexibility but extreme resiliency. However, such elastomers, because of their pronounced "springiness" or "bouncyness" lack in energy or shock absorbing properties. A second group of materials are the semi-rigid foams, such as the fatty acid triglyceride-reacted polyurethanes. These foams are not adequately resistant to destructive mechanical action since they tend to collapse or to be defoamed permanently by compression, flexing or impact.

The cellular materials which we have discovered surprisingly exhibit the main advantages of elastomer-like polyesters, such as suppleness and flexibility, but in addition possess remarkable energy absorbing qualities. Our materials, while being flexible, in addition, exhibit a singularly large capacity to absorb energy upon impact, allied with the capacity to expand to their original dimensions. They are typified by a capacity to absorb an amount of energy upon impact in the range of 85 to 100% under the standard conditions described below.

FIG. 1 is a graphic comparison between the energy absorbed by various cellular resins and the products of this invention over a wide range of temperatures. Table I below identifies the products tested; the energy absorbing test to which the foam samples were subjected is described further hereinafter.

TABLE I

Shock absorbing properties of various cellular products

| Curves | Type |
|---|---|
| 1 | A typical product of this invention prepared in accordance with Example 1. |
| 2 | A polyurethane modified alkyd made from castor oil and diethylene glycol. |
| 3 | A foamed polystyrene. |
| 4 | A polyadipate polyurethane foam. |
| 5 | A foamed commercial product of a modified polyvinyl chloride. |

Accordingly, our novel cellular products are valuable in situations where foamed cellular resinous materials are useful and particularly wherever high energy absorbing qualities are desirable. Outstanding valuable applications include slabs or pads for cushioning materials as coverings, linings, mattresses, pillows, punching bags, heels, soles, and as a sound deadening material, accoustical tiles and the like. Other uses and advantages of our invention will become apparent from the following description of our invention.

In accordance with our invention, our polyisocyanate cellular materials are derived from the following components:

(a) Saturated polyesters having at least 70 mole percent of the alcohol component made up with a particular aromatic glycol and having a functionality not less than 2.2;
(b) At least one isocyanate;
(c) Water, and optionally
(d) Catalysts, emulsifiers, plasticizers and other additives.

In accordance with our invention, we employ particular polyesters which are further described below.

*The polyester component*

The polyester component is prepared in its simplest form from two polyfunctional ingredients, one being a polybasic carboxylic acid, generally a dibasic carboxylic acid, and the other ingredient being a particular aromatic glycol, further described hereinafter by the following general formula:

in which A is an aryl group containing from 6 to 17 carbon atoms, such phenyl, tolyl, anthyl, xylyl and naphthyl. The aryl group A may be substituted with one or more non-interfering substituents, such as with alkyl, nitro, halo, thioethers, sulfinyl, sulfonyl, alkoxy, and similar groups. Preferably A is phenyl and alkylphenyl containing from 6 to 9 carbon atoms. When A is substituted with alkyl substituents, it is preferred that they contain not more than 3 carbon atoms each; when the substituent is an alkoxy group, preferably the alkyl portion thereof should not exceed 3 carbon atoms each; when the substituent is halo, it is preferably chlorine; $R^1$ and $R^2$, which may be alike or different, are primary, secondary, or tertiary, preferably primary alkanols, each containing preferably from 2 to 4 carbon atoms, more specifically each containing 2 carbon atoms; and X is preferably a nitrogen atom.

It is noteworthy that the principal values of our cellular polyurethane products appear to be derived in major part from the presence of bulky aromatic groups on the polyester chain, and not so much from the nature of the particular atom represented by X. Accordingly, other atoms, such as carbon, may replace the nitrogen atom with substantially equivalent results. Hence, when X equals a tetravalent atom, such as carbon, our aromatic glycols may be represented as follows:

where $R^3$ is a hydrogen atom or an alkyl group, preferably containing not more than 3 carbon atoms, and $R^1$, $R^2$ and A are defined above. Typical thereof being 3-phenylpentadiol-1,5, 3-phenyl-3-methylpentanediol-1,5, and the like.

In a preferred embodiment of our invention, where X is a nitrogen atom, the special aromatic aminoglycols are prepared from aromatic amines, such as aniline, which may have substituents or not. The aromatic amines may be reacted in the presence of water and a catalyst with one or a mixture of different alkylene oxides, such as ethylene oxide, butylene oxide, propylene oxide, or the like, or with cyclic ethers, such as tetrahydrofuran. The oxide is used in at least double the molar amount in order to provide the final difunctional glycol.

Typical useful aromatic aminoglycols include N,N'-bis(hydroxyethyl)aniline, N - hydroxyethyl - N' - 4 - hydroxybutylaniline, N - 4 - hydroxybutyl - N' - 3 - hydroxypropylaniline, N,N' - bis(4 - hydroxybutyl)aniline, N,N'-bis(3-hydroxypropyl)aniline; the N-phenyl group may be substituted by other aryl groups, such as N-naphthyl, to yield N,N'-bis(hydroxyethyl) - β - naphthylamine, N,N'-bis(hydroxyethyl) - α - naphthylamine, N,N' - bis(4-hydroxybutyl) - naphthylamine, N,N' - bis(hydroxyethyl)-o-toluidine, its ring isomers and the like. The aryl group may also be substituted, such as in its isomers, N,N'-bis(hydroxyethyl)-p-xylidene, its isomers, N,N'-bis-(hydroxyethyl)-o-anisidine, its isomers, N,N'-bis(hydroxyethyl)-p-phenetidine, its isomers, and the like.

Since, as we discussed above, the greatest value of our cellular products appears to be derived in major part from the aryl groups on the polyester chain, we have considered further increasing the ratio of the aryl groups to hydroxyl groups in the polyester. However, as of now, such products do not yet combine all the unexpected properties of the products of the present invention.

We have further found that in order to obtain the full benefits of our invention, the above-described aromatic glycol of our invention should not be used as the sole alcohol component to prepare essentially linear polyesters but that the branching, expressed as functionality, of the polyester should be increased over two to within the range of 2.2 to 3.0 by introduction of a determined proportion of an alcohol having a functionality of more than two to form polyesters which, upon reaction with isocyanate, are desirably cross-linked to a limited extent, which are harder and less heat-sensitive. This desirable result is effectuated by increasing the proportion of alcohols having a functionality of greater than 2.0 to the extent of obtaining a polyester having a functionality in the range of 2.2 to 3.0 and preferably in the range of 2.4 to 2.6. Polyfunctional alcohols that may be employed include glycerol, pentaerythritol, trimethylolethane, trimethylolpropane, and others. The limited branching of the polyesters appears to further enhance the unique shock absorbing properties evidenced by our polyurethane foamed products.

Whereas it is required to have a minimum of cross-linking in the polyester by introducing a limited proportion of an alcohol of functionality greater than 2, it is not necessary to employ the particular aromatic glycol defined above as the exclusive glycol component of our alcohol. The valuable contribution of energy absorbing qualities provided by these aromatic glycols are so pronounced that we found that it is sufficient to employ these aromatic glycols in an amount ranging from 70 mole percent to 100 mole percent of the glycol portion of the polyester. Smaller proportions tend to abruptly decrease the virtues of the polyurethane foam to a level where the shock absorbing properties are practically nil. Hence, we use the defined aromatic glycol in a proportion ranging from 70 mole percent to 100 mole percent, more desirably in the range of about 85 mole percent to 100 mole percent of the glycol component of alcohol ingredient of the polyesters. Other glycols that may be employed in conjunction with our aromatic glycols include the polyfunctional glycols described above and those having terminal hydroxyl groups separated by 2 to 10 methylene groups, such as ethylene glycol, trimethylene glycol, tetramethylene glycol, pentamethylene glycol, hexamethylene glycol, heptamethylene glycol, octamethylene glycol, nonamethylene glycol, and decamethylene glycol, or such glycols as 1,2-propylene glycol, dipropylene glycol, 1,3-butylene glycol, diethylene glycol, polyethylene glycol, 2,2-diamethylpropanediol-1,3-glycerine monoethyl ether, or the like. Monohydric alcohol may also be employed, but its effect in decreasing the functionality of the polyester must be compensated by the use of a larger proportion of polyfunctional alcohol.

The acid component of the polyester preferably is of the dibasic type, or polybasic type and, though it may contain unreactive aromatic unsaturation, usually it is free of reactive unsaturation such as ethylenic groups or acetylenic groups. If unsaturated carboxylic acids are employed, for best results they should not be used in amounts exceeding 5 mole percent. As unsaturated polycarboxylic acids or anhydride, there may be employed fumaric, mesaconic, itaconic, citraconic, the anhydrides, as maleic anhydride, and the like. The unsaturation, such as occurs in the rings of such aromatic acids as phthalic acid, terephthalic acid, isophthalic acid or the like, is non-ethylenic and non-reactive. These acids, for purposes of the present invention, may be regarded as being saturated, and they may be employed in the preparation of the polyesters herein disclosed. Other non-ethylenic dicarboxylic acids free of reactive unsaturation comprise those acids in which the carboxyl groups are interconnected by open hydrocarbon chains. Suitable acids of this type include succinic acid, adipic acid, sebacic acid, azelaic acid, diglycolic acid, oxalic acid, glutaric acid, pimelic acid, suberic acid, α-ethylsuberic, α,α - diethyladipicphthalic acid, isophthalic acid, terephthalic acid, the anhydrides, cyclohexane dicarboxylic acid, and naphthalene dicarboxylic acid, and others containing up to about 10 carbon atoms in the hydrocarbon chain. Mixtures of two or more of these acids may be utilized. In most instances, adipic acid is presently preferred either as the sole acid compound or as a mixture with other dibasic acids, such as the phthalic acids previously mentioned.

As discussed above, we found that the introduction of an alcohol having a functionality greater than 2 in an amount to bring the functionality of the polyester to at least 2.2 enhances the value of our invention. An equivalent effect may be accomplished by employing in conjunction with the described dicarboxylic acids other polybasic acids having more than 2 acid radicals, such as in citric acid.

The esterification reaction employed in preparation of the polyester comprises heating the mixture of a stoichiometric amount of acid and alcohol, with or without esterification catalyst, to a temperature to effect evolution of water, but below that of substantial charring or darkening of the product, e.g. to 150° C. to 280° C. The reaction may be effected in the presence of a non-reactive diluent, such as xylene, which will distill azeotropically to assist in carrying away the water of reaction. The reaction is preferably continued until the product is viscous, but liquid, or at least becomes a liquid when it is heated. An important aspect of our invention is to reduce the acid value of the polyester to below 5, preferably to not more than 1.0, and most preferably to within the range of 1.0 to zero.

We have further found that the average molecular weight of the polyester must be held within definite limits in order to permit successful subsequent modification with isocyanate to yield the products of our invention. Preferably, the average molecular weight of the polyester is controlled in order to fall within the range of 1000 to 3000, the range of 1500 to 2000 being specially preferred. Moreover, since the hydroxyl groups provide the reactive sites for further reaction with isocyanate, they too must be carefully controlled in order to give a polyester having a hydroxyl number within the range of 41 to 170 more desirably in the range of 67 to 96. Polyesters having a hydroxyl number in the range specified possess the proper amount of reactive groups for further reaction with the isocyanate and to ultimately yielding the desired cellular product.

Since the extent of the reaction with the isocyanate is also related to the amount of water in the polyester, we found that in order to obtain the desired type of cellular products the polyester should preferably be essentially anhydrous, desirably to such a degree as to provide a residual water content not exceeding about 0.3%, and preferably in the range of 0.1 to zero percent.

*The isocyanate component*

The polyester is mixed with at least one polyisocyanate in an amount sufficient to react with the hydroxyl groups of the polyols, and to provide a substantial excess of isocyanate molecules as compared with the available hydroxyls for the reaction with water to liberate the necessary gas for the final foam. Generally, when a diisocyanate is employed, it is used in a ratio to provide about 2 to 5 moles of diisocyanate per molar equivalency of hydroxyls in the polyesters. Correspondingly lesser amounts are needed when tri- and tetraisocyanates are employed. An illustrative group of diisocyanates include decamethylene diisocyanate,
ethylene diisocyanate,
trimethylene diisocyanate,
tetramethylene diisocyanate,
pentamethylene diisocyanate,
propylene-1,2-diisocyanate,
butylene-1,2-diisocyanate,
butylene-1,3-diisocyanate,
butylene-2,3-diisocyanate, and
butylene-1,3-diisothiocyanate;
alkylidine diisocyanates, such as
hexamethylene diisocyanate,
ethylidene diisocyanate ($CH_3CH(NCO)_2$),
butylidene diisocyanate $CH_3CH_2CH_2CH(NCO)_2$,
cycloalkylene diisocyanates such as
cyclopentylene-1,3-diisocyanate,
cyclohexylene-1,2-diisocyanate,
cyclohexylene-1,4-diisocyanate;
aromatic diisocyanates such as
m-phenylene diisocyanate,
p-phenylene diisocyanate,
1-methylphenylene-2,4-diisocyanate,
naphthylene-1,4-diisocyanates,
o,o'-toluenediisocyanate;
aromatic diisocyanates such as
xylylene-1,4-diisocyanate,
xylylene-1,3-diisocyanate,
4,4'-diphenylenemethane diisocyanate, and
4,4'-diphenylenepropane diisocyanate,
hexylisocyanate,
p-phenylenediisocyanate,
o-phenylene-diisocyanate,
methylene-bis(4-phenylisocyanate),
1-chloro-2,4-phenylenediisocyanate,
diphenyl-3,3'-dimethyl-4,4'-diisocyanate,
diphenyl-3,3'-dimethoxy-4,4'-diisocyanate,
1,3-phenylene diisocyanate,
p-dixylyl methane-4,4'-diisocyanate,
4,4',4''-triphenyl methane triisocyanate,
benzene-1,2,4-triisocyanate,
triisocyanate made from p-fuchsin.

Toluene diisocyanates of the 2,4- and 2,6-isomeric forms are preferably employed to obtain fast reaction, but such isocyanates as diphenyl methane-4,4'-diisocyanate and p-menthane-diisocyanate may be used for a slower reaction or where a more vigorous catalyst is employed. Tetraisocyanates like p,p',o,o'-diphenylmethane tetraisocyanate may also be employed.

The amount of polyisocyanate which is desirably employed to prepare the novel cellular products of this invention may vary over a considerable range. In major part, the amount of polyisocyanate is determined by the nature of the polyester employed; more particularly, by the number of equivalence in the polyester, namely the total number reactive hydroxyl and carboxylic groups in the polyester. Accordingly, the equivalent amount of polyisocyanate should be at least 1.01 of the equivalence of reactive functional groups in the polyester. Generally, the equivalence ratio of organic polyisocyanate groups to reactive functional groups in the polyester is in the range of 10 to 1.1, preferably in the range of 4.5 to 1.1, and more specially in the range of 3.5 to 1.1. Generally, the larger excess of polyisocyanates may be employed in the preparation of the foamed products by means of prepolymers, e.g., prereacting the polyester with an excess of polyisocyanate and then reacting the residual excess polyisocyanate with water to produce the desired foam.

On the basis of the polyisocyanate equivalence employed, there may be determined the equivalence of water used for foaming. The equivalence of water that may be used is preferably from at least a stoichiometric amount. It may range as high as 10 times the stoichiometric amounts and even higher under special circumstances. Generally, the equivalence of water may range from stoichiometric to four times the excess of polyisocyanate equivalence over equivalence of reactive groups in the polyester. It should be noted, however, that these ranges of polyisocyanates and water are guides which one skilled in the art may adapt to the properties desired in the final foams, to his particular conditions, the type of catalysts, the temperatures, and the precise nature of the polyester reacted. The water, if desired, may be replaced by a hydrating agent or latent source of water, such as a hydrated salt as represented by the trihydrate of sodium acetate, the decahydrate or heptahydrate of sodium sulfate (Glauber's salt), the heptahydrate of magnesium sulfate, or other agent which at the temperatures attained in the reaction between the polyester, the polyisocyanate and the water liberates water in situ. If hydrated salts are employed as a source of water, the amount thereof should be sufficient to provide water in the aforementioned range.

*The catalyst*

The reaction between the isocyanate and polyester and water is desirably promoted by having present a catalyst. Presently, tertiary amines, such as triethylamine, dialkylaminoalcohol, diethylcyclohexylamine, dimethyl hexadecyamine, dimethylcetylamine, pyridine, quinoline, and 3-methylisoquinoline are desirable groups. Also useful catalysts include the N-alkyl morpholines in which the alkyl substituents have from 1 to 18 carbon atoms of which N-methylmorpholine is typical, triethylamine, triethanolamine, dimethylethanolamine, N,N-diethylcyclohexylamine, and 1,4-diazabicyclo[2.2.2] octane. The preferred catalyst is the N-alkylmorpholine type because they strongly and efficiently promote the reaction and also because they constitute good solvent media which tend to reduce the viscosity of the prepolymer, if it tends to be overly viscous.

Still other catalysts which may be employed comprise quaternary ammonium compounds which under conditions of reaction are adapted to decompose to liberate tertiary amines in situ. Examples of such materials are salts of tertiary amines, such as N-methylmorpholine and anhydrides of dicarboxylic acids, such as acetic acid.

To promote the stabilization of the foam, an emulsifier may be employed. Where it is desirable to prepare a prepolymer, an emulsifying agent may be incorporated with the prepolymer with or without added catalyst; where no prepolymer is prepared, the appropriate emulsifying agent is combined with the polyester. The amount of emulsifier may be from 0.5% to 5% on the weight of the polyester or on the weight of the prepolymer. Non-ionic emulsifiers are preferred, such as the ethylene oxide condensates derived from vegetable oils, such as castor oils, from alcohols, organic acids, phenols, and hydroxy esters. More specifically, such emulsifiers include castor oil condensed with 6 to 60% or more oxyethylene units, alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctyl, phenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule, analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

The amounts of catalyst range from about 2 to 12% by weight based on the weight of polymer. The catalyst may be introduced at any appropriate time, preferably just prior to addition of the other reactants.

Additives

A further special aspect of our invention is that we may advantageously extend the remarkable high energy absorbing properties of our polyurethane foams over a greater volume of foamed mass and at the same time desirably reduce the viscosity of the foamable mixture. This may be accomplished by introduction into any of the components before foaming a particular plasticizing agent which is an acylated product of the polyester component employed in this invention and fully described above. These polyesters are acylated so that preferably substantially all terminal hydroxyl groups are esterified with a monocarboxylic acid containing preferably 2 to 4 carbon atoms, most preferably 2 carbon atoms. The esterification may be effectuated with one or a mixture of acylating agents. Typical thereof are acetic acid, propionic acid, acetic anhydride, butyric acid, valeric acid and the like. We found that this plasticizer should be employed in amounts ranging from 1 to 50% on the weight of the polyester, preferably in the range of 5 to 20%. When the polyester component employed in our invention is plasticized with the acylated polyester there are obtained products of high homogeneity and compatibility. Even more valuable advantages are an increase in plasticizing action during foaming of the reactants resulting in a more efficient utilization of the liberated gas and, hence, further improvement in cellular structure. In addition, by decreasing the viscosity of the plastic mixture, less energy is required to foam the plastic and much greater ease is encountered in mechanical fabrication. These advantages combined with the remarkable high energy absorbing properties of our polyurethanes foamed products make these plasticized products a specially favored group.

Other polymeric plasticizers may be employed in comparable amounts. In the monomeric class, high polar plasticizers are preferred. Examples thereof are trichloroalkyl phosphates, such as tri (β-chloroethyl)phosphate, trichloropropyl phosphate, or tricresyl phosphate.

If desired, there may also be added various other additives such as leafing compounds, pigments, dyes, and the like.

In making the cellular products of our invention, the various ingredients may be mixed in different ways, depending on the particular resin polyisocyanate system involved. If desired, the cellular products of the present invention may be manufactured from hte polyesters on continuous production machines. In order to produce the products by simultaneous mixing, the polyester is supplied to the mixing head from one line in the machine, the isocyanate, the water and catalyst, and if desired, the emulsifier from still other separate lines. When it is desired to make the products of our invention from the "prepolymer," the polyester is first reacted with the isocyanate in the amounts specified above and the catalyst-water-emulsifier mixture may then be added to the chain-extended polyester. Other suitable modifications may be devised as needed. Finally, the mixture is introduced into a mold or fed continuously to a container or a moving conveyor, and the foam allowed to rise and set at room temperature or with the application of heat, dependent on the curing requirements for the polyurethane system employed.

The following examples further illustrate the preparation and properties of our cellular high energy absorbing polyurethanes. They are not to be construed as limiting the invention in scope. All parts and percentages are by weight unless specified to the contrary.

EXAMPLE 1

*Preparation of a typical polyester.*—There are charged to a reaction flask equipped with a mechanical stirrer and a thermometer 752 parts of N-phenyldiethanolamine. The compound was melted in an inert atmosphere and with stirring there were added 31.7 parts of trimethylolethane followed by 552.5 parts of adipic acid. Heating was continued to and at a temperature of 220° C. until 136.4 parts of water were removed. As water evolution slowly decreased, the vacuum was applied carefully so as to promote removal of water without any of the reactants. The polyester product had a viscosity of about 1600 centistokes (when measured as a 75% solids solution in xylene), an acid number of 2 and a hydroxyl number of 64. Its functionality is 2.4.

EXAMPLE 2

In a similar manner, a viscous liquid is made from 601.6 parts of N-phenyldiethanolamine, 88.2 parts of diethylene glycol, 35.4 parts of trimethylolpropane and 552.5 parts of adipic acid. Its functionality is 2.4. This product is useful for foaming into a cellular product having a singularly great capacity to absorb energy upon impact while still returning to original dimensions.

EXAMPLE 3

In a like manner, a viscous liquid is prepared from 526.3 parts of N-phenyldiethanolamine, 132.1 parts of diethylene glycol, 35.4 parts of trimethylolpropane, and 552.5 parts of adipic acid.

To 100 parts of this polyester there are admixed 26.4 parts of toluene diisocyanate, 1 part of sulfonated soybean oil, 1.69 parts of water, and 1 part of N-methylmorpholine. The mixture is poured into an open mold and allowed to foam to full height. The resulting foam is subjected to the impact tester. It is demonstrated that it absorbs more than 80% energy upon impact. It also comes rapidly back to original dimensions.

The following polyesters are prepared following the above-described procedure. Amounts are given in parts; functionality is indicated as "$f$."

Polyester:
(1) N-phenyldiethanolamine _____ 1229.2
    Trimethylolethane _____ 24
    Adipic acid _____ 875.1
    $f=2.2$
(2) N-phenyldiethanolamine _____ 1157.3
    Trimethylolethane _____ 72
    Adipic acid _____ 875.1
    $f=2.6$
(3) N-phenyldiethanolamine _____ 1121.1
    Trimethylolethane _____ 96.0
    Adipic acid _____ 875.1
    $f=2.8$
(4) N-phenyldiethanolamine _____ 1084.9
    Trimethylolethane _____ 120
    Adipic acid _____ 875.1
    $f=3.0$
(5) N-phenyldi-n-butanolamine _____ 1516
    Trimethylolethane _____ 72
    Adipic acid _____ 875.1
    $f=2.6$
(6) N-phenyldiethanolamine _____ 892.2
    Trimethylolethane _____ 50.2
    Diethylene glycol _____ 174.5
    Adipic acid _____ 875.1
    $f=2.4$
(7) N-phenyldiethanolamine _____ 1012
    1,4-butylene glycol _____ 88.6
    Trimethylolethane _____ 50.2
    Adipic acid _____ 875.1
    $f=2.4$
(8) N-phenyldiethanolamine _____ 1566.1
    Trimethylolethane _____ 48
    Adipic acid _____ 1176
    $f=2.4$
(9) N-phenyldiethanolamine _____ 915.8
    Trimethylolethane _____ 72.0
    Adipic acid _____ 680
    $f=2.6$
(10) N-phenyldiethanolamine _____ 1067.2
    Pentaerythritol _____ 54.4
    Sebacic acid _____ 1069.0
    $f=2.8$
(11) N-o-tolyldiethanolamine _____ 1324
    Trimethylolethane _____ 24
    Adipic acid _____ 875.1
    $f=2.2$
(12) N-xylyldiethanolamine _____ 1374
    Trimethylolethane _____ 48
    Adipic acid _____ 875.1
    $f=2.4$
(13) N-phenyldiethanolamine _____ 386.3
    N-phenyldi-n-butanolamine _____ 1010
    Trimethylolethane _____ 72
    Adipic acid _____ 875.1
    $f=2.6$
(14) N-phenyldiethanolamine _____ 1124.8
    Trimethylolethane _____ 24.0
    Pentaerythritol _____ 13.6
    Azelaic acid _____ 1036.1
    $f=2.4$
(15) N-phenyldiethanolamine _____ 1220.6
    Pentaerythritol _____ 34
    Adipic acid _____ 875.1
    $f=2.5$
(16) N-phenyldi-n-butanolamine _____ 1376
    1,4-butylene glycol _____ 88.6
    Trimethylolethane _____ 50.2
    Adipic acid _____ 875.1
    $f=2.4$ In the production of the cellular plastic materials of this invention the selected ingredients are thoroughly mixed together in the required proportions to produce a foamed plastic having the desired properties. The polyester resin may be mixed with the other necessary and optional ingredients. When the several ingredients have been properly mixed the resulting reactant composition is poured into a mold or cavity or in the structure of which the cellular plastic is to form a part, or is applied by other convenient means. The composition is allowed to react at atmospheric pressure and in order to best develop the advantages of the cellular products it may be subjected to a moderate heating in the range of 25° to 70° C. Though the exothermic heat may be adequate it is generally more desirable to subject the product to a post-cure at a temperature in the range of from about 50° C. to about 90° C., preferably in the range of 70° C. to 80° C. The plastic firmly adheres to the surfaces of practically any solid material during the foaming reaction and retains its adherance when it has set and cured.

When it is desired to prepare prepolymers the appropriate hydroxyl-containing polyesters are reacted with the suitable amount of isocyanate. desired, this prepolymer is mixed with water and catalyst to yield the foamed product. The foamed cellular plastic material has small cells, spherical in configuration, that are substantially inter-communicating and that are substantially uniformly distributed throughout the plastic mass. The cellular plastic materials exhibit a large capacity to absorb impact energy allied with excellent recovery to original dimensions.

In the following examples which further illustrate this invention, parts and percentages are by weight, unless otherwise specifically noted.

EXAMPLE 4

There are mixed 100 parts of the polyester of Example 1 with 26.4 parts of toluene diisocyanate (80% 2,4-isomer, 20% 2,6-isomer). To this mixture there are added 1.0 part of emulsifier (sulfonated vegetable oil: here soybean oil), 1.69 parts of water, and 1 part of N-methyl morpholine in that order with thorough mixing. The mixture is poured into an open mold and allowed to foam to full height which required about 3 minutes to give a cellular mass of a density of 5.6 lbs. per cubic foot.

In a similar manner the polyester of Example 2 is reacted with 28.4 parts of toluene isocyanate in the presence of 2 parts of emulsifier and using 2 parts of diethylethanolamine as catalyst. The reaction mass is allowed to foam to full height.

Following the same procedure, a foamed mass is prepared using 1 part of triethylamine, the other components remaining the same.

Similar good capacity to absorb energy is exhibited by the foamed product.

EXAMPLE 5

To 100 parts of a polyester there are thoroughly admixed 20 parts of [tri(β-chloroethyl)phosphate]. To this mixture, there are added 1.5 parts of dimethyl polysiloxane silicon oil as emulsifier, 1.69 parts of water, and 2.0 parts of N-methylmorpholine in that order with thorough mixing after addition. Finally, 25.8 parts of xylene diisocyanate are added and blended with the mixture for 30 to 60 seconds. The mixture is poured into an open mold in the form of a tray and allowed to foam undisturbed to full height. The resulting cellular pad has an apparent density of 8.5 lb./cubic foot. This foam is made into a small pillow which exhibits less bouncyness than similar ordinary pillows made from conventional foams.

With the polyester of illustrations 2, 3, 4, 5, and 6, there are admixed in a similar maner [tri(β-chloroethyl)phosphate] in a proportion varying from 5 to 20%. The incorporation of the plasticizer was found to facilitate the manufacture of the foamed products. Instead of using [tri(β-chloroethyl)phosphate], there is employed tricresyl phosphate with similar results.

EXAMPLE 6

Ninety-five parts of a polyester of illustration 7 is thoroughly blended with 5 parts of a plasticizer which is the acylated product of the plasticizer of illustration 7(a). Then there is added one part of sulfonated vegetable oil emulsifier, and 5 parts of dimethyl polysiloxane silicon oil. Then there is added a mixture of 1.5 parts of water and one part of diethylcyclohexylamine. The mixture is allowed to foam undisturbed in a mold to full height.

EXAMPLE 7

Two hundred parts of a polyester of illustration 13 are mixed with 1.7 parts of water, 1 part of N-methylmorpholine, 1 part of triethylamine and 1.8 parts of dimethyl polysiloxane silicon oil in a mold until foaming starts. The foaming mix is then poured into a mold and allowed to foam undisturbed to full height. The cellular product exhibits compressive resistance and an enlarged capacity to absorb energy.

In a similar way, a foamed cellular product is obtained when this initial polyester is admixed with 3 parts of an acetylated polyester of illustration 1.

EXAMPLE 8

To 75 parts of a polyester prepared as in illustration 1 there are mixed 25 parts of a polyester derived from 636 parts of adipic acid, 499.2 parts of diethylene glycol and 26.4 parts of 1,1,1-trimethylolethane. To this mixture, there are added 25.8 parts of toluene diisocyanate (80% 2,4-isomer and 20% 2,6-isomer), 1.0 part of sulfonated cottonseed oil and mixing is continued until homogeneity is achieved. Then there are added a mixture of 2.0 parts of N-methylmorpholine and 2.68 parts of water. After stirring for about 30 seconds, the mixture assumed the appearance of a foaming mass due to the appearance of small amounts of carbon dioxide bubbles. This foaming mass was then immediately transferred to a metal mold coated with a solution of paraffin wax in petroleum ether as releasing agent. The foamed mass was allowed to reach its maximum volume. The material was a cellular mass which combined a good resistance to damage by compression and a great capacity to absorb shock upon impact. The apparent density of this mass was about 6.64 lbs./cu. ft.

EXAMPLE 9

To 100 parts of a prepolymer derived from Example 1, there are admixed 1.5 parts of N-methylmorpholine and 1.1 parts of triethylamine. While mixing is continued, there are blended into the mixture 0.5 part of dimethyl polysiloxane silicon oil and 2.4 parts of water. The foaming mix is poured in an open mold and allowed to foam undisturbed until full height is obtained. The foamed slab is removed from the mold. It is useful as a crash pad.

The shock absorbing properties of the cellular products of our invention are tested by ASTM method D-1054-55 modified to increase its sensitivity. This method is customarily employed for testing the resiliency and shock absorbent capacity of rubber and cellular materials. In the test, a 4.72 pound pendulum hammer is dropped from a given height against cylindrical samples of foams 1" x 1.129" in diameter cut out from typical products of this invention from commercially available polyurethane foams. Upon impact, the hammer imparts to the specimen a specific amount of energy and a portion of that energy is returned by the specimen to the pendulum. The amount of energy returned to the pendulum is proportional to the extent that the pendulum rebounds. The energy returned to the pendulum is proportional to the vertical component of the displacement and, accordingly, the impact resilience of the sample R can then readily be determined from the following equation:

$$R = \frac{1 - \cos \text{ angle of rebound}}{1 - \cos \text{ original angle}} \times 100$$

Since R represents the percentage energy remaining in the pendulum after rebound, the percentage energy absorbed by the foam is calculated by subtracting R from 100.

The table below illustrates the remarkable capacity of typical samples of this invention to absorb energy upon impact.

The samples employed in the tests are cut to a thickness of 2". Shock absorption is tested on two sides, side A and side B. The average energy absorbed by impact on both sides is stated under the average column. The pendulum is positioned at two different angles before impact at 45° C. and at 90° C. The values given are averages of at least five individual determinations.

TABLE II

*Energy absorption of typical cellular products of this invention*

| Angle of rebound | 45° | | | 90° | | |
|---|---|---|---|---|---|---|
| Side of foam | A | B | Average | A | B | Average |
| Percent energy absorbed: Products— | | | | | | |
| 1 A | 96 | 96 | 96 | 96 | 96 | 96 |
| 1 B | 98 | 97 | 97.5 | 96 | 96 | 96 |

All foams rapidly came back to their original dimensions. No cracks or fissures were observed in the samples.

TABLE III

*Properties of typical foams*

| Products | Percentage energy absorbed | Recovery to original dimensions |
|---|---|---|
| 1 | 95 | <1 minute. |
| 2 | 89 | Permanently deformed. |
| 3 | 88 | Permanently deformed. |
| 4 | 81 | <1 minute. |
| 5 | 77 | <1 minute. |

The definition of the products numbered 1 to 5 is found above. The data show that only product 1, a typical foam product of this invention absorbs a major portion of energy upon impact, while exhibiting full recovery to original dimensions. The common products of the art either do not adequately absorb energy or they permanently deform upon impact.

Accordingly, our novel products may be characterized and distinguished over common foams by having the capacity to absorb at least 85% and preferably from at least 90% to essentially all energy upon impact, at 75° F. under the standard conditions of the test described. Also, unlike foamed polystyrenes or modified foamed alkyds, the products of this invention exhibit at 25° C. under the described test conditions, essentially full recovery to their original dimensions. Generally, the recovery to original dimensions is reached in less than 2 minutes, in some circumstances in less than 10 minutes under the conditions of the described test. Accordingly, the cellular products of this invention by virtue of their unique properties are very valuable in a great variety of applications where capacity to absorb energy upon impact should be allied with recovery of original dimensions.

We claim:

1. A cellular plastic material comprising a water-reacted poly(ester-urethane) product of an organic polyisocyanate with a polyester resin having an hydroxyl and carboxyl functionality of 2.2 to 3.0 and said polyester resin comprising a condensation product of a mixture comprising polycarboxylic acid and polyhydric alcohol components, the polyhydric alcohol component comprising polyhydric alcohol and glycols, the glycols comprising about 70 to 100 mole percent of an aminoglycol of the general formula I

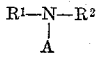

where A is an aryl group containing 6 to 17 carbon atoms, and R¹ and R² are hydroxyalkyls each containing from 2 to 4 carbon atoms.

2. The cellular plastic material of claim 1 in which in the aminoglycol of Formula I A is phenyl.

3. The cellular plastic material of claim 2 in which the aminoglycol is N-phenyldiethanolamine.

4. A cellular plastic material comprising a water-reacted poly(ester-urethane) product of an organic polyisocyanate with a polyester resin having an hydroxyl and carboxyl functionality of 2.2 to 3.0 and an average molecular weight of 1000 to 3000 and said polyester resin comprising a condensation product of a mixture comprising polycarboxylic acid and polyhydric alcohol components, the polyhydric alcohol component comprising polyhydric alcohol and glycols, the glycols comprising about 70 to 100 mole percent of an aminoglycol of the general Formula I $$R^1-N-R^2 \atop \mid \atop A$$

where A is an aryl group containing 6 to 17 carbon atoms, and R¹ and R² are hydroxyalkyls each containing from 2 to 4 carbon atoms.

5. A cellular plastic material comprising a water-reacted poly(ester-urethane) product of at least one aromatic diisocyanate with a polyester resin having an hydroxyl and carboxyl functionality of 2.4 to 2.6 and said polyester resin comprising a condensation product of a mixture comprising saturated dicarboxylic acid and polyhydric alcohol components, the polyhydric alcohol component comprising a trihydric alcohol and glycols, the glycols comprising 70 to 100 mole percent of an aminoglycol of the general formula I.

6. The cellular plastic material of claim 5 in which the glycols comprise 85 to 100 mole percent of an aminoglycol of the general Formula I.

7. The cellular plastic material of claim 5 in which the sole glycol is N-phenyldiethanolamine.

8. The cellular product material of claim 5 in which the dicarboxylic acids contain from 6 to 10 carbon atoms.

9. The cellular product of claim 8 in which the dicarboxylic acid is adipic acid.

References Cited in the file of this patent

UNITED STATES PATENTS

| | | |
|---|---|---|
| 2,625,531 | Seeger | Jan. 13, 1953 |
| 2,888,411 | Pace | May 26, 1959 |